April 21, 1942.   G. SLAYTER ET AL   2,280,101
ELECTRIC FURNACE AND MELTING METHOD
Filed March 29, 1940   3 Sheets-Sheet 1
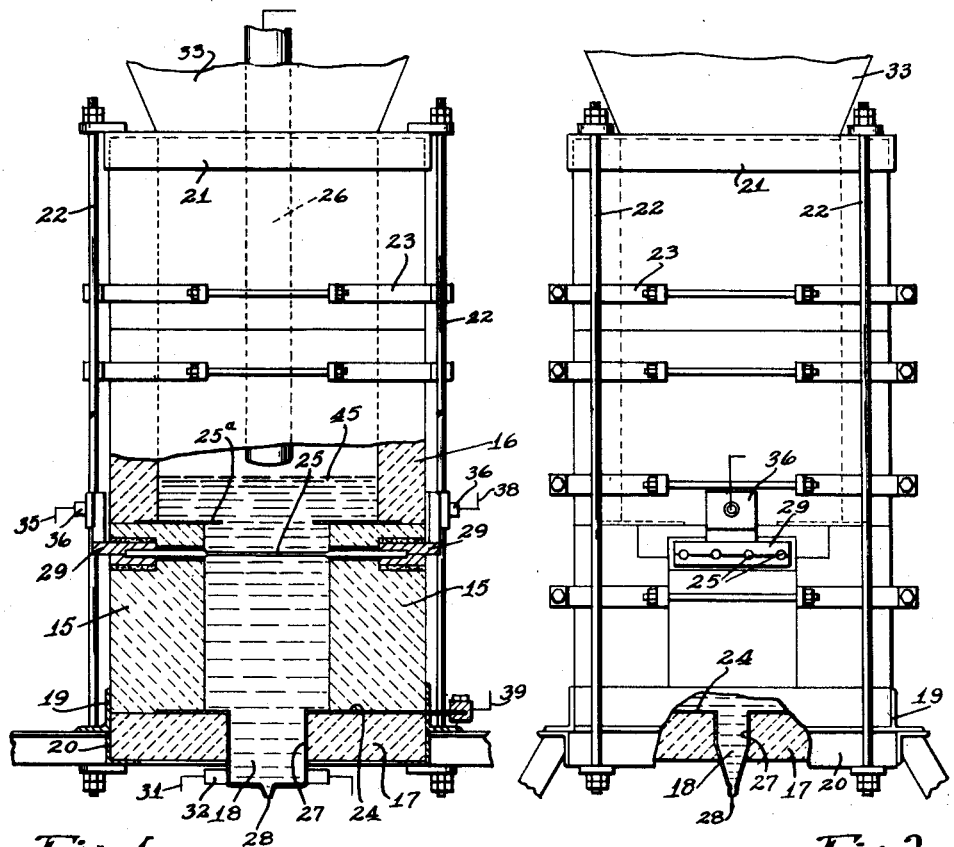
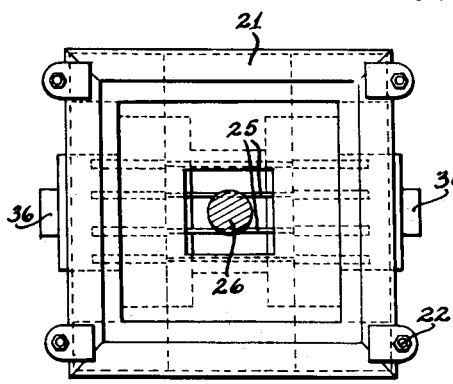
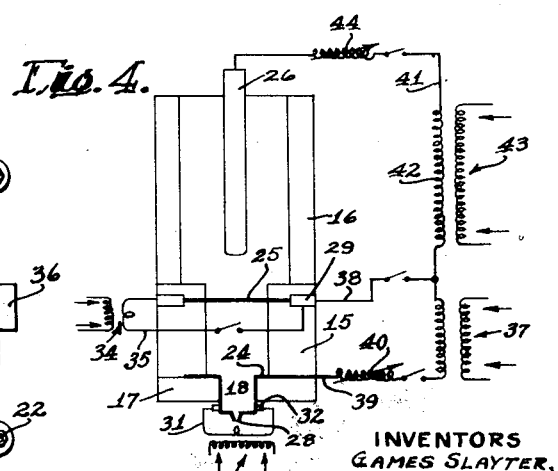
INVENTORS
GAMES SLAYTER,
F. W. ATKINSON,
ED FLETCHER and
H. V. SMITH.
BY
ATTORNEY April 21, 1942.  G. SLAYTER ET AL  2,280,101
ELECTRIC FURNACE AND MELTING METHOD
Filed March 29, 1940  3 Sheets-Sheet 2
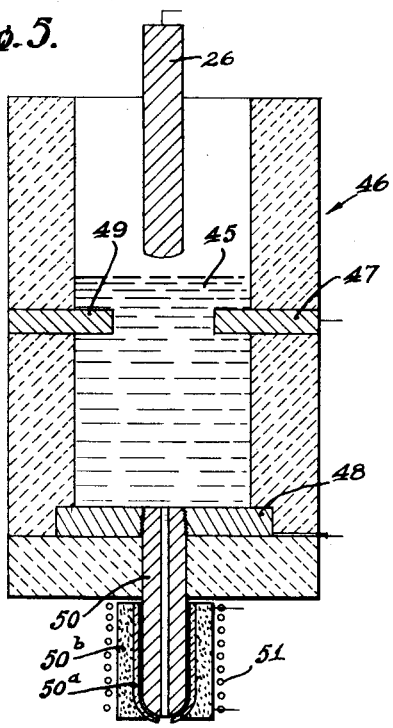
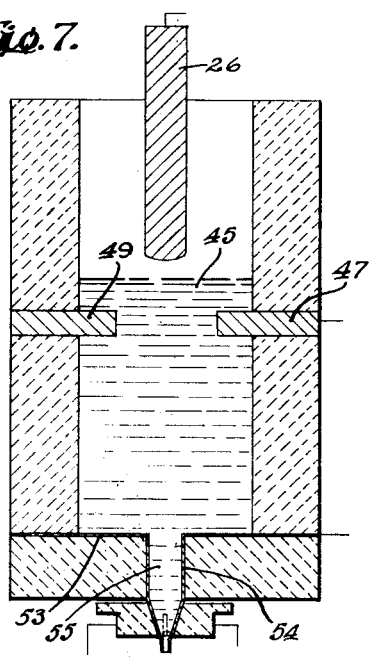
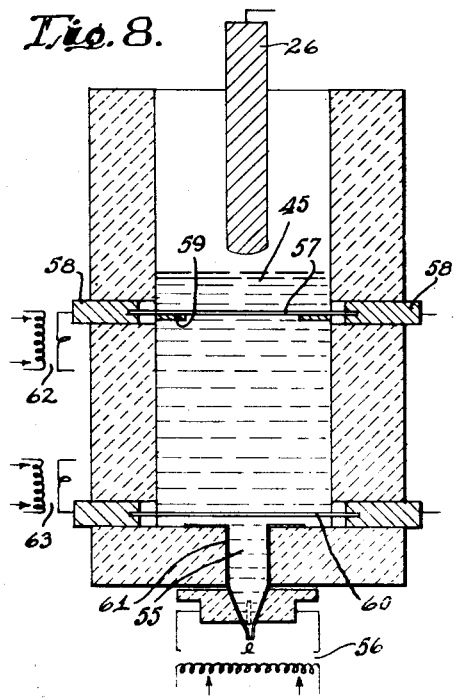
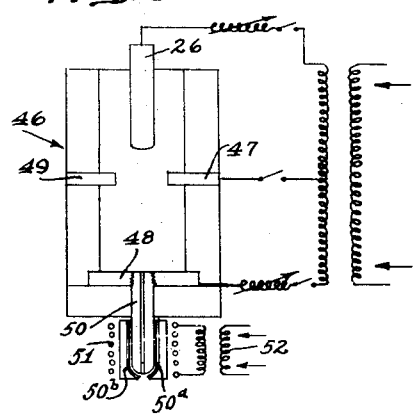
GAMES SLAYTER,
F. W. ATKINSON,
ED FLETCHER
H. V. SMITH.
INVENTORS
BY
ATTORNEY April 21, 1942. G. SLAYTER ET AL 2,280,101
ELECTRIC FURNACE AND MELTING METHOD
Filed March 29, 1940 3 Sheets-Sheet 3

INVENTORS
GAMES SLAYTER,
F.W. ATKINSON,
ED FLETCHER
H.V. SMITH.
BY
ATTORNEY

Patented Apr. 21, 1942

2,280,101

UNITED STATES PATENT OFFICE 2,280,101

ELECTRIC FURNACE AND MELTING METHOD

Games Slayter, Flavius W. Atkinson, Ed Fletcher, and Harry V. Smith, Newark, Ohio, assignors to Owens-Corning Fiberglas Corporation, Toledo, Ohio, a corporation of Delaware Application March 29, 1940, Serial No. 326,714

7 Claims. (Cl. 13—6)

Our invention relates to electric furnaces and methods for melting and refining glass and other materials.

An object of the invention is to provide a novel type of furnace which may be used successfully for melting all kinds of glasses or solutions of metal oxides in each other, silicates, vitreous materials and the like.

A further object of the invention is to provide such a furnace and controls therefor arranged and adapted to give stability of operation which has not been heretofore obtained.

The invention provides a furnace for melting and refining glass and other refractory materials, in which more than two electrodes are provided and arranged in such manner that the preliminary heating and melting of the batch may be carried on between two electrodes and the continued operation by which the materials are more completely melted or brought into solution and refined are carried on between other electrodes. Thus the melting of the batch may be effected by means of an electric arc passed through the batch material between a pair of electrodes or between one electrode and the body of molten glass in which the second electrode is immersed while a further heating and refining is taking place by passing electric current through the glass between the second and third electrode, the glass serving as a resistor in which the heat is generated.

An object of the invention attained by the use of a furnace employing electrodes arranged, for example, in such manner that the batch is melted by an arc between a middle and upper electrode and the glass further melted and refined between the middle and lower electrode, is to obtain adequate control of the temperatures and the rate at which the glass flows, thereby permitting a single furnace to be satisfactorily used for supplying glass at a rate varying through a wide range and also serving for use with various batch formulas.

A further object of the invention is to provide an electric furnace in which the heating and melting operations are stabilized in such a manner that the furnace may be left with the electric current on and a flow of current sufficient to maintain the furnace at a high temperature without requiring the attention of an attendant.

A further object of the invention is to provide an electric furnace of the character indicated which gives a high thermal efficiency.

Other objects of the invention will appear hereinafter.

Referring to the accompanying drawings:

Fig. 1 is a part sectional front elevation of one form of electric melting and refining furnace constructed in accordance with the present invention;

Fig. 2 is a part sectional side elevation of the same;

Fig. 3 is a top plan view of the furnace;

Fig. 4 is a diagrammatic view showing electrical circuits and controls for the furnace shown in Figs. 1 to 3;

Fig. 5 is a sectional elevation showing a modified form of furnace;

Fig. 6 is a diagrammatic view of the furnace shown in Fig. 5 and the electrical circuits and controls therefor;

Fig. 7 is a sectional elevation of a furnace embodying a further modification;

Fig. 8 is a similar view of still another modification;

Figure 9:
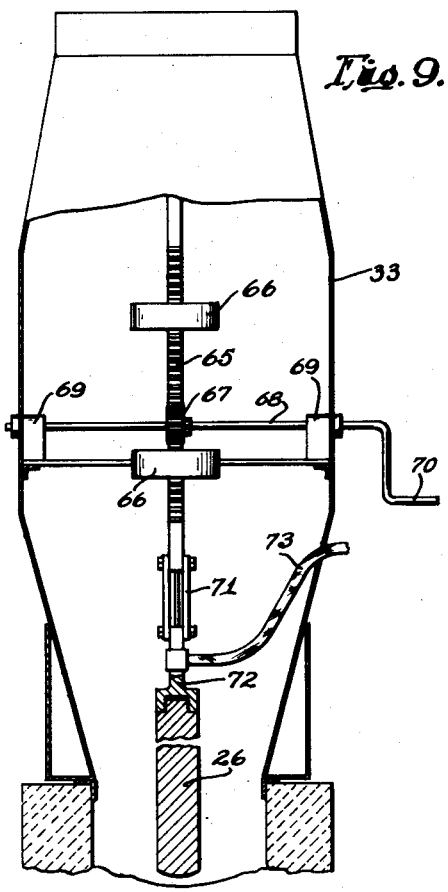
Fig. 9 is a part sectional view showing a batch feeder or hopper and mechanism for adjusting the carbon electrode up and down.

Referring to Figs. 1 to 4, we have illustrated an electric furnace designed for melting and refining glass or the like and comprising walls of refractory material. The side walls comprise refractory blocks 15 defining a lower compartment of the furnace and blocks 16 providing an upper compartment. The floor 17 of the furnace is formed with a well or outlet opening 18 extending therethrough. The refractory walls of the furnace are supported by an outer metal frame structure including angle bars 19 and 20 surrounding the lower end of the furnace, angle bars 21 surrounding the upper end of the furnace, vertical tie rods 22, and straps 23 surrounding the furnace at intermediate points.

The furnace is provided with three electrodes, namely, a bottom electrode 24, an intermediate electrode 25 and an upper electrode 26. The bottom electrode 24, which may consist of platinum, a platinum-iridium alloy or the like, is shown in the form of sheet metal overlying the furnace floor and clamped in position between the floor blocks 17 and the side walls 15. The electrode 24 is formed with an integral sheet metal bushing 27 lining the walls of the outlet 18. The bushing extends below the furnace floor and is formed with an outlet opening or openings 28 through which the molten glass is discharged.

The intermediate electrode 25 comprises an open-work structure and as herein shown consists of a series of uniformly spaced parallel rods distributed throughout the transverse area of the furnace chamber. The ends of the rods may be anchored in blocks 29 of electrically conducting material, said blocks being embedded in the furnace walls. The rods 25 may be made of tungsten or other metal or alloy capable of withstanding the high temperature and physically and chemically resistant to the action of the molten material.

Baffle plates 25ᵃ are disposed around the interior of the furnace walls in proximity to the middle electrode 25. As shown, these plates overlie the upper surface of the blocks 15 and protrude inwardly a short distance beyond the furnace walls. These plates which may be made of molybdenum, tungsten or other suitable metal, serve to confine the flow of glass to the central portion of the furnace as it passes the electrode 25 and thereby prevents hot glass from attacking the copper terminals 29 which secure the rods 25.

The upper electrode 26 as herein shown consists of a carbon rod extending downwardly into the furnace centrally thereof. Means are provided for adjusting this electrode up and down as shown, for example, in Fig. 9 and hereinafter described.

The platinum bottom electrode 24 may be used as an electrical resistance heating unit for supplying heat to the batch in order to start the furnace when cold. This electrode is further used as a heating unit to control the rate of flow of the molten material from the furnace. For this purpose electric current may be supplied through a variable transformer 30 (Fig. 4). The secondary circuit 31 is connected to terminal blocks 32 attached to or formed integral with the bushing 27. The electrode 24 further serves as one of the electrodes in a circuit for supplying heat to the body of molten glass contained between it and the electrode 25, the heat being generated in the body of glass itself by the ohmic resistance of the glass flowing therethrough.

The tungsten rods 25 also are used as resistance heating elements as well as serving as an electrode when the glass is being heated by its resistance to a current passing therethrough. They are used as resistance heaters to aid in bringing the cold furnace up to a temperature at which the current may be passed through the glass itself. Since the cold glass is a very poor conductor, usually a temperature of about 1400° F. is necessary to allow current to pass through the glass so that the melting and refining operations may be continued while the electrodes 25 and 24 function as such rather than as resistors.

The raw batch materials or cullet, which may be in granular, comminuted or powdered form, are fed into the top of the furnace through a hopper 33. In starting the operation this material may be heated by the electrodes 24 and/or 25 operating as resistors in the manner above described until the batch is brought to a temperature at which it will conduct the electric current, permitting the electrodes to function as such. An additional circuit may then be established through the carbon rod 26 which forms the upper electrode and current passed therethrough. An arc is drawn between the carbon electrode and the upper surface of the molten batch. The raw batch material which is being fed downward through the upper or melting compartment of the furnace, surrounds the carbon electrode and is sintered and melted more or less completely by the electric arc.

The material as it is thus melted or partially melted is fed downwardly continuously from the melting compartment above the electrode 25 into the refining compartment comprised between the electrode 25 and the bottom electrode 24. In this lower compartment the molten glass is heated to a higher temperature and brought to a fluent condition in which the batch materials are completely dissolved. The gases or seeds which occur in the molten glass are permitted to escape and the glass is thereby refined before being discharged through the outlets 28. The lower compartment, comprised between the electrodes 25 and 24, is referred to as a refining compartment because of the refining action which ordinarily takes place therein, and also serves as a temperature regulating compartment as more fully set forth hereinafter.

Referring to Fig. 4 the intermediate electrode 25 when used as a resistor may be heated by current supplied from an adjustable transformer 34, the secondary of which is connected in a circuit 35 including the resistor 25. Connectors 36 provide electrical connection between the circuit 35 and the blocks 29. The intermediate and bottom electrodes 25 and 24 are connected in the secondary circuit of an adjustable transformer 37. The secondary of this transformer is connected by a conductor 38 to the electrode 25 and by a conductor 39 to the electrode 24. Reactance is provided in this circuit by an air core reactor 40, the purpose of which will presently be described. The circuit through the electrodes 25 and 26 includes the conductor 38 and a conductor 41 connected to the opposite terminals of the secondary coil 42 of a variable transformer 43. An air core inductance 44 is provided in the conductor 41 between the transformer and the electrode 26.

In the circuit comprising the upper and intermediate electrodes 26 and 25 there is a substantial amount of resistance in the arc between the carbon tip and the molten glass 45, considerable resistance in the glass between the arc and the electrode 25, and also the resistance of the reactance coil 44. In a furnace employing such a circuit it has been found necessary to have a proper balance between the amount of heat generated in the arc and the amount of heat generated in the body of glass. If too much heat is liberated in the arc the batch is sintered and reduced to a semi-molten mass containing gas and some incompletely melted materials faster than the body of the glass below can assimilate them and convert them into a homogeneous mass. If too small an amount of heat is developed in the arc, then the glass in the pool will be heated to a higher temperature than necessary, resulting in a waste of power. It is possible to design a furnace of proper dimensions so that a single circuit from the bottom electrode 24 to the top of the carbon electrode will give the proper balance provided the furnace is used for only one specific glass but such particular design of furnace would not serve satisfactorily for glasses of different formulae because such glasses of different compositions have different electrical characteristics, and volt ampere characteristics suitable for one glass may not be suitable for another.

In accordance with the present invention the furnace is designed to melt any and all glasses or similar refractories and the electrical heating circuits accordingly have been made very flexible. It will be observed that as is shown in Fig. 4 there are four separate heating circuits in the furnace, each controllable separately from the others. Two of these circuits supply power from the transformers 30 and 34 respectively for heating the electrodes 24 and 25 as resistors and are intended primarily for starting the melting operations and for controlling the glass issuing from the furnace but may be used further to supply additional heat when and where needed during the continued melting and refining operations. The current supplied from the transformer 30 through the feeder bushing 27 provides means for supplying localized heat to the walls of the outlet 28 for regulating the temperature and fluency of the issuing glass at the outlet and thereby effectively controlling the rate of flow.

The third circuit extends between the electrodes 24 and 25 and impresses a suitable voltage upon the glass between these electrodes in the refining compartment and is designed to give the proper amount of current flow through the glass. Since the electrical resistance of the glass decreases with an increase in temperature we employ a step type of transformer 37 to control the amount of heat generated in this portion of the furnace. The reactor 40 is also placed in this circuit to give further aid in controlling the amount of heat generated. An air core reactor is used here in order to get a constant increase in the voltage drop through the reactor with increase of current. The reactor may be stepped either up or down and thereby set to limit the current to any desired value. It provides a stabilizing effect when used with the body of glass as far as the current flow through the glass and the voltage across the whole circuit are concerned.

We have also found that by the use of the reactor 40 in series with the molten glass in the furnace, it is possible to leave the furnace at a high temperature between periods of operation for melting and fining glass. By calculation it has been found that in an electrical circuit of this kind having appreciable reactance and resistance, the maximum kilowatts available are obtained when the resistance and the reactance are equal. In the present case the reactance and the voltage drop across the system are held constant, while the current and the resistance of the glass are variable. As the temperature of the glass increases, its resistance is reduced which allows more current to flow. So long as the ohmic resistance of the glass is greater than the ohmic resistance of the reactor, the kilowatts available are increased with an increase in temperature. However, when the temperature rises to a point at which the ohmic resistance of the glass is less than the ohmic reactance of the reactor, the kilowatts available will be reduced as the temperature is increased.

The fourth circuit is that comprising the electrode 25 and the carbon electrode 26. This circuit comprises the body of molten glass, an arc between said glass and the carbon electrode and the reactor 44. When an arc is used alone it has a negative volt ampere characteristic. Within the operating range of the furnace, the voltage necessary to maintain an arc of a certain length in a given atmosphere decreases with an increase of the amperes carried. In order to compensate for this characteristic, it is necessary to use either a resistor or reactor in series with the arc. In the present case the body of glass acts as a resistor and aids in stabilizing the arc, but only to a certain degree since it, too, has a negative volt ampere characteristic. The air core reactor 44 is also used to further stabilize the arc. Sufficient reactance is supplied in this reactor to require an increase in voltage for any increase in the amperage.

The batch fed into the hopper 33 surrounds the carbon electrode 26 and moves downward therealong, thus serving to cool the electrode and keep the heat which is being generated confined to a small space in the central portion of the furnace. This results in giving a very high thermal efficiency since the hottest portion of the furnace is at or near its geometrical center and all the heat which is generated must pass through the material which is being melted before it can go to waste. This has been demonstrated by the use of the present furnace, being shown by the fact that we have pulled glass out of the bottom of the furnace at the center at 2780° F. while the inside of the side walls registered a maximum of 2300° F. and a minimum of 1000° F.

Figs. 5 and 6 illustrate a modified form of furnace 46 now to be described. The side walls and floor of the furnace consist of refractory blocks. The furnace is equipped with an upper carbon electrode 26, an intermediate electrode 47 and a bottom electrode 48, the latter overlying and preferably covering the floor of the furnace. The electrodes preferably are all made of carbon. The upper electrode 26 is movable up and down in the path of the oncoming raw batch. The intermediate electrode 47 is disposed transversely of the furnace and is provided in the center thereof with an opening 49 through which the glass passes into the refining chamber comprising the space between the intermediate and bottom electrodes. The bottom electrode 48 is formed with an opening therethrough in which is secured a tube 50, preferably of carbon. A high frequency electric heating coil 51 supplies heat to the tube 50 and the glass flowing therethrough, thereby regulating the temperature and rate of flow of the issuing glass. The coil 51 is connected in the secondary circuit of a variable transformer 52. The carbon tube 50 is surrounded or encased by a refractory shell 50ᵃ and insulating material 50ᵇ, the latter interposed between said shell and the coil 51.

The operation of the furnace shown in Figs. 5 and 6 is or may be substantially the same as that described in connection with Figs. 1 to 4, except that it permits a modified method of starting the furnace and bringing it up to a working temperature. For this purpose the top electrode 26 may be moved downward into proximity to the carbon electrode 48 and an arc established to commence the melting operation. As the molten glass gradually accumulates, the top electrode is gradually withdrawn so as to continuously maintain an arc between it and the rising pool of molten glass. This is continued until the molten glass fills the refining compartment and reaches the level of the intermediate electrode 47. Current may then be supplied through the second circuit thus established between the intermediate and lower electrodes while the first circuit extends between the intermediate and upper electrodes for maintaining the arc and continuing the melting operation.

As a modification of the method just described for starting the operation, a circuit may be established including the intermediate and upper electrodes 47, 26, and an arc drawn between these electrodes. Raw batch materials are then fed into the furnace and as they are melted run down into and gradually fill the lower compartment, permitting a circuit to be established including the middle and bottom electrodes 47, 48, with the heated glass therebetween serving as an electrical resistor.

Fig. 7 illustrates a further modification. The furnace structure is similar to that shown in Fig. 5 except that a sheet metal bottom electrode 53 is employed in place of the carbon electrode 48 of Fig. 5. This bottom electrode may be made of platinum or other siutable material and has formed integrally therewith a feeder bushing 54 which lines the outlet opening 55 extending through the floor of the furnace. The bushing 54 and particularly the lower end portion thereof through which the molten glass issues, may be separately heated by electric current supplied through a transformer 56, the secondary of which is connected in a circuit extending through the bushing. With this form of furnace, the melting operation may be started by supplying electric current through the lower electrode 53 which acts as a resistor, gradually heating and melting the batch until a circuit can be established through the glass between the bottom electrode 53 and the intermediate electrode 47.

The furnace operation may also be started by lowering the top electrode 26 into proximity to the electrode 47 and striking an arc between the said electrodes. The raw batch materials surrounding the upper electrode and enveloping the arc are gradually melted and run down through the opening 49 until the lower compartment is filled, permitting the melting and fining operation to be continued in the usual manner above described.

Fig. 8 illustrates a further modification in which the intermediate electrode 57 consists of a series of rods of tungsten or the like spaced and arranged in a manner similar to that disclosed in Figs. 1 to 3. These rods are connected to terminal blocks 58 embedded in the side walls of the furnace. A baffle plate 59 positioned directly beneath the rods 57 extends along the inner wall surfaces of the furnace, preferably encompassing the periphery of the refining chamber. These baffle plates may also be made of tungsten. They function in substantially the same manner as the baffles 25ª (Fig. 1) as heretofore described. A bottom electrode 60 consisting of tungsten rods or the like is constructed and arranged substantially as described in connection with the electrode 57. A bushing 61 provides a lining for the outlet opening 55 in the floor of the furnace and may be of substantially the same construction as the bushing 54 in Fig. 7 except that it is mounted separately from the bottom electrode. It may be heated electrically by current supplied from the transformer 56. In starting the furnace shown in Fig. 8, said electrodes 57 and/or 60 may be electrically heated by current supplied through transformers 62 and 63, the electrodes functioning as resistors until the batch is heated to a temperature at which it will conduct current, after which the melting and fining is continued in the same manner as above set forth in connection with other forms of the furnace.

Fig. 9 illustrates the batch hopper 33 which is adapted to be mounted on any of the furnaces herein shown. The mechanism for lifting and lowering the upper electrode 26 is also shown in this view, being mounted within the hopper 33. Said mechanism includes a rack bar 65 within the hopper, being mounted for vertical movement in guides 66 supported between walls of the hopper. A pinion 67 is keyed to a rod 68 journalled in bearing blocks 69 attached to the side walls of the hopper. The pinion engages the rack 65 and is rotated by a hand crank 70 for lifting or lowering the rack bar and the electrode 26 suspended from said bar. The connection between the electrode and rack bar includes links 71 of electric insulating material, said links connected to a head 72 to which the electrode is secured. Current is supplied to said head and the electrode through a cable 73.

Figure 10:
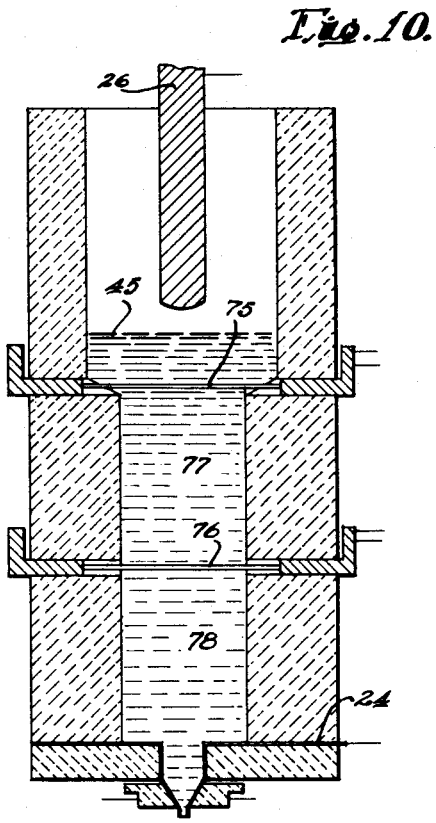
Fig. 10 is a fragmentary sectional elevation showing a further modification of the furnace employing more than three electrodes and providing a plurality of refining compartments.
Figure 11:
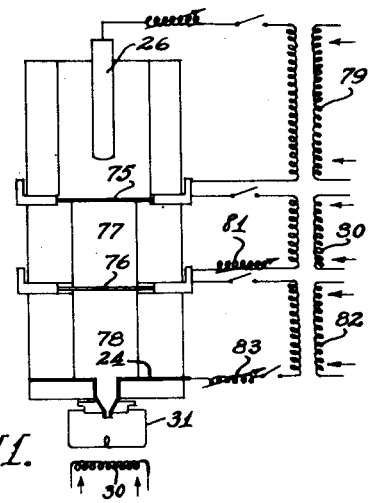
Fig. 11 is a diagrammatic view of the furnace shown in Fig. 10 and the electrical circuits and controls therefor.

Figs. 10 and 11 illustrate a further modification of furnace construction wherein there are provided two intermediate electrodes 75 and 76, between the upper electrode 26 and the bottom electrode 24. The intermediate electrodes 75 and 76 may be of the same construction as the electrode 25 (Figs. 1 to 3). The electrode 75 is located at the juncture of the melting and refining compartments. The electrode 76 is positioned at an intermediate level in the refining compartment, dividing the latter into an upper refining chamber 77 and a lower refining chamber 78.

A variable transformer 79 supplies current for the circuit through the electrodes 26 and 75. A transformer 80 supplies current for a circuit through the electrodes 75 and 76, said circuit including an air core reactor 81. A transformer 82 supplies current for a circuit extending through the electrodes 76 and 24, said circuit including an air core reactor 83.

The operation of the furnace shown in Figs. 10 and 11 is substantially the same as that described in connection with Figs. 1 to 4 except that the additional circuit gives greater flexibility of control. It permits separate regulation, adjustment and control of the current supplied to the refining chambers 77 and 78, thereby facilitating the regulation and control of the temperature and rate of flow in the glass in the furnace and also gives an elaborate control of the refining operations. Thus the current supplied through the electrodes 76 and 24 may be regulated to control the temperature and rate of flow of refined glass, while the temperature in the other refining compartment 77 may be separately regulated and controlled as required to effect the refining of the glass.

Figure 12:
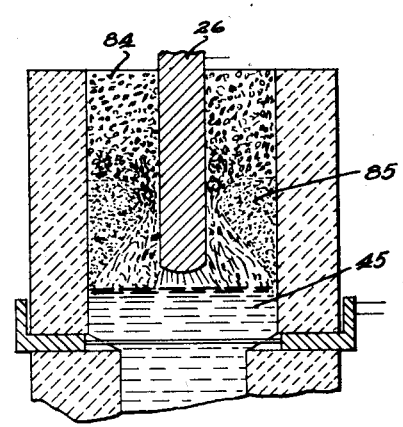
Fig. 12 is a fragmentary sectional elevation illustrating particularly the melting operation.

Fig. 12 illustrates a condition which characterizes our method of melting the batch in furnaces such as herein illustrated. The raw batch material 84 as it is fed into the hopper is carried downward along the top electrode 26 and into the arc between the electrode and the surface of the molten glass 45 where it is partially melted. In this zone there is great turbulence of the melting materials and the partially melted batch builds itself into a sort of dome-shaped roof 85 which surrounds the lower portion of the electrode. The turbulent gases within this melting zone blow gas bubbles which break and shift the path of the electric current. The gases escape upwardly along the electrode while the batch feeds downwardly along the electrode into the seething mass or vortex beneath the roof 85. The material forming this roof apparently is cooled and hardened sufficiently to provide a more or less permanent wall surrounding the electrode and providing a passageway through which the comparatively cold batch materials are carried to the melting zone and through which the hot gases escape while transmitting their heat to the descending comminuted batch. This condition results in efficiency of operation by reducing heat losses to a minimum. As the batch is directed downwardly in contact with the electrode, the latter is kept comparatively cool. The heat from the electric arc is prevented from escaping and is absorbed by the surrounding batch.

Modifications may be resorted to within the spirit and scope of our invention.

We claim:

1. The method of melting and refining glass or other refractory material which when unmelted is a nonconductor and when molten is a conductor of electric current, which method comprises passing an electric current through a circuit including an upper and an intermediate electrode, maintaining an electric arc in said circuit between said electrodes, enveloping the upper electrode in the raw material and feeding the raw material downwardly while surrounding the electrode, into the zone of said arc and thereby heating the material by heat generated in said arc, to a temperature at which it will conduct electric current, passing an electric current through a second circuit including said intermediate electrode and a bottom electrode spaced therebelow, with the heated material forming a resistor included in the circuit between said intermediate and bottom electrode, and thereby further heating and refining the material by the heat generated therein by the current passing therethrough.

2. The method of melting and refining glass or the like which comprises establishing an electric circuit extending between an upper and an intermediate electrode, passing an electric current through said circuit and maintaining an arc between the electrodes, enveloping the upper electrode and said arc in batch material and feeding the batch material downward through the zone of said arc and thereby melting the material and causing it to form a pool in which said intermediate electrode is immersed, with said pool extending downward to a bottom electrode, providing a second electric circuit including said intermediate and bottom electrodes and the molten glass therebetween, and flowing an electric current through said second circuit and thereby further heating and refining the molten glass by the current passing therethrough.

3. The method of melting and refining glass and like materials in an electric furnace including top, bottom and intermediate electrodes, said method comprising maintaining a pool of molten material extending from the bottom electrode upward to a level above the intermediate electrode and in which the latter is immersed, establishing an electric circuit including the top and intermediate electrodes, passing electric current through said circuit and maintaining an arc between the top electrode and the molten material, feeding raw batch downward into the zone of said arc and melting it by the heat of said zone, withdrawing the refined molten material from the bottom of the furnace and thereby maintaining a downward flow of the material between the intermediate and bottom electrodes, establishing an electric circuit including therein the molten material between said intermediate and bottom electrodes, and passing an electric current therethrough by which the material is further heated and refined during its passage between said intermediate and bottom electrodes.

4. The method of melting and refining glass or similar materials in an electric furnace comprising top, bottom and intermediate electrodes, which method comprises lowering the top electrode into proximity to the bottom electrode, establishing an electric circuit including said top and bottom electrodes and drawing an arc therebetween, feeding raw batch into the furnace and gradually melting it by the heat of said arc and thereby forming a pool of the molten material, moving the upper electrode upwardly as the melting continues and the level of the pool rises until the intermediate electrode is immersed in the pool of molten material, thereafter passing electric current between the intermediate and lower electrodes for heating and refining the molten material while said arc is maintained, and withdrawing the refined molten material from the bottom of the furnace while additional material is fed into the furnace and melted by the arc maintained between the top electrode and the said pool.

5. An electric furnace comprising refractory side walls and floor defining an upper melting compartment and a lower refining compartment, said floor having an outlet opening therethrough, a lower sheet metal electrode overlying said floor and including a bushing extending through said outlet opening and lining the walls thereof, said bushing formed with an outlet opening, an intermediate electrode adjacent the upper end of the refining compartment, a top electrode within the melting compartment, means for establishing an electric circuit extending through said intermediate and top electrodes, means for establishing a second electric circuit through said intermediate and bottom electrodes, and means for supplying electric current through said bushing independently of said circuits for supplying heat to the bushing and the material flowing therethrough and thereby regulating the temperature and rate of flow of the material through the bushing outlet.

6. Apparatus for melting and refining glass and similar materials, said apparatus comprising an electric furnace having refractory walls, bottom and top electrodes in said furnace, means for moving the top electrode downward within the furnace into proximity to the bottom electrode, means for supplying electric current in a circuit through said electrodes and establishing an arc between the electrodes, means for feeding batch material into the furnace and causing it to be melted by the heat of said arc and form a pool of molten material within the furnace, an intermediate electrode, means for establishing a circuit independent of said bottom electrode and including said top and intermediate electrodes, and means for supplying an electric current through a circuit including said intermediate and bottom electrode while maintaining said arc between the top electrode and the pool of molten material.

7. The method of melting glass and like materials which comprises maintaining a pool of molten glass, flowing an electric current through a circuit including an electrode extending downwardly and spaced above the pool and maintaining an arc between the electrode and the surface of the pool, feeding comminuted raw batch downwardly along the electrode and causing it to be melted by the heat of the arc, and so regulating the volume of current flow and rate at which the batch is fed through the zone of the arc that a roof or dome of sintered batch is built up around the electrode and spaced therefrom to provide, with the electrode, an annular passageway through which the batch moves downward to the melting zone and through which gases generated during the melting operation escape upwardly.

GAMES SLAYTER.
FLAVIUS W. ATKINSON.
ED FLETCHER.
HARRY V. SMITH.